United States Patent
Mackowiak et al.

(10) Patent No.: US 10,658,900 B2
(45) Date of Patent: May 19, 2020

(54) POWER ELECTRONICS MODULE AND HYBRID MODULE WITH AN E-MOTOR POWER CONNECTION

(71) Applicant: Schaeffler Technologies AG & Co. KG, Herzogenaurach (DE)

(72) Inventors: Stefan Mackowiak, Malsch (DE); Cedric Blaes, Munchhausen (FR); Andreas Trinkenschuh, Buhl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 564 days.

(21) Appl. No.: 15/036,200

(22) PCT Filed: Oct. 24, 2014

(86) PCT No.: PCT/DE2014/200592
§ 371 (c)(1),
(2) Date: May 12, 2016

(87) PCT Pub. No.: WO2015/078459
PCT Pub. Date: Jun. 4, 2015

(65) Prior Publication Data
US 2016/0268867 A1    Sep. 15, 2016

(30) Foreign Application Priority Data
Nov. 26, 2013 (DE) .......................... 10 2013 224 087

(51) Int. Cl.
*H02K 5/20* (2006.01)
*H02K 5/22* (2006.01)
(Continued)

(52) U.S. Cl.
CPC ............... *H02K 5/225* (2013.01); *B60K 6/26* (2013.01); *B60K 6/38* (2013.01); *B60W 20/10* (2013.01);
(Continued)

(58) Field of Classification Search
CPC ........... H02K 5/225; H02K 5/20; H02K 11/33
See application file for complete search history.

(56) References Cited

U.S. PATENT DOCUMENTS 5,895,207 A    4/1999 Burgdorf et al.
6,334,796 B1    1/2002 Fromme et al.
(Continued)

FOREIGN PATENT DOCUMENTS

DE            4320005        1/1995
DE          102012222110    6/2013
(Continued)

*Primary Examiner* — Dang D Le
(74) *Attorney, Agent, or Firm* — Volpe and Koenig, P.C.

(57) ABSTRACT

The invention relates to a power electronics module for operating a hybrid module for a hybrid drive unit, said hybrid module includes an E-motor which can produce a drive torque of the hybrid drive unit. The power electronics module includes an E-motor connection on the power electronics module side which has a contact device on the power electronics module side which is connected to the power electronics module for directly connecting to a contact device on the hybrid module side provided on the hybrid module, of a hybrid module-sided E-motor power connection. The invention also relates to a hybrid module for a hybrid drive unit and to a method for mounting and/or assembling a hybrid module for a hybrid drive unit.

14 Claims, 7 Drawing Sheets

(51) Int. Cl.
  *H02K 11/33* (2016.01)
  *H02K 5/10* (2006.01)
  *B60K 6/26* (2007.10)
  *B60K 6/38* (2007.10)
  *B60W 20/10* (2016.01)
  *H02K 15/00* (2006.01)

(52) U.S. Cl.
  CPC .............. *H02K 5/10* (2013.01); *H02K 5/20* (2013.01); *H02K 11/33* (2016.01); *H02K 15/00* (2013.01); *H02K 2203/03* (2013.01)

(56) References Cited

U.S. PATENT DOCUMENTS

| | | | | |
|---|---|---|---|---|
| 7,763,998 | B2 * | 7/2010 | Makino | H02K 3/522 310/71 |
| 8,786,149 | B2 * | 7/2014 | Yamashita | B62D 5/0406 310/416 |
| 9,180,866 | B2 | 11/2015 | Helmer et al. | |
| 2003/0094920 | A1 | 5/2003 | Numaguchi et al. | |
| 2006/0006094 | A1 * | 1/2006 | Hofmann | H02K 5/10 206/706 |
| 2013/0076174 | A1 | 3/2013 | Wibben et al. | |
| 2013/0099609 | A1 | 4/2013 | Ikeno et al. | |
| 2013/0193795 | A1 | 8/2013 | Kojima et al. | |

FOREIGN PATENT DOCUMENTS

| | | |
|---|---|---|
| EP | 0977341 | 2/2000 |
| EP | 1000790 | 5/2000 |
| EP | 1622241 | 2/2006 |
| EP | 2498383 | 9/2012 |
| JP | H04334944 | 11/1992 |
| JP | 2010263768 | 11/2010 |

* cited by examiner

POWER ELECTRONICS MODULE AND HYBRID MODULE WITH AN E-MOTOR POWER CONNECTION

BACKGROUND

The invention relates to a power electronics module and a hybrid module for hybrid driven machines, particularly vehicles with a hybrid drive, which have a combination of electric and internal combustion engines.

The valuable contribution of prior art DE 10 2012 222 110 A1 shows a clutch device with an actuating device for a drive train of a motor vehicle, comprising an internal combustion engine, an electric machine with a stator and a rotor, and a transmission device, with the clutch device being arranged in the drive train between the internal combustion engine, on the one side, and the electric machine as well as the transmission device, at the other side, with the clutch device and the actuating device being integrated in the rotor of the electric machine in order to improve the clutch device with regards to its design and/or function.

The inventors set out to further improve the devices of prior art. In particular, the costs and/or assembly expense should be reduced and/or the reliability should be increased.

SUMMARY

The objective is particularly attained in a power electronics module for operating a hybrid module for a hybrid drive unit, with the hybrid module comprising an E-motor, by which a drive torque of the hybrid drive unit can be generated, with the power electronics module comprising an E-motor power connection at the power electronics module side, which has a contact device at the power electronics module side connected to the power electronics module for the direct connection to a contact device at the hybrid module side of an E-motor power connection at the hybrid module side.

The objective is further attained, in particular, in a hybrid module for a hybrid drive unit, with the hybrid drive unit comprising an E-motor, by which a drive torque of the hybrid drive unit can be generated, and with the hybrid module comprising an E-motor power connection at the hybrid module side, which has a contact device at the hybrid module side connected to the hybrid module for the direct connection to a contact device, provided at the power electronics module side at a power electronics module of an E-motor power connection at the power electronics module side.

The objective is further attained particularly in a method for the assembly and/or construction of a hybrid module for a hybrid drive unit, with the hybrid module comprising an E-motor by which a drive torque of the hybrid drive unit can be generated, with a contact device at a power electronics module side, connected to a power electronics module of an E-motor power connection at the power electronics module side being directly connected to a contact device at the hybrid module side of an E-motor power connection at the hybrid module side provided directly at said hybrid module.

This way, a simple contacting is provided for the E-motor between the power electronics module and the hybrid module. This saves expensive high-voltage cables, which on the one hand lowers costs and on the other hand increases safety (because cables are susceptible to malfunction, e.g., in case of an accident or accidental manipulation).

A hybrid module is preferably a coupling module, which comprises an E-motor (electric motor) as the electric drive unit and preferably a clutch, preferably a separating clutch, particularly preferred including an additional damper system. It will be or is preferably arranged axially between the internal combustion engine and the driven side, e.g., wheels, preferably with a transmission interposed between the hybrid module and the driven side. The hybrid module is preferably a motor vehicle hybrid module. Preferably the hybrid module comprises a hybrid module housing. A hybrid module housing is preferably at least partially the electric drive unit and/or at least partially the cover surrounding the clutch of the hybrid module. Particularly preferred, the hybrid module housing encompasses the electric drive unit and/or the clutch in a sealing fashion with regards to a fluid, e.g., cooling liquid. Preferably one or more cooling fluid channels are provided in the hybrid module housing, in which fluid flows freely, particularly circulates. The hybrid module preferably comprises an E-motor power connection and/or an electric signal and/or clutch actuator connection and/or a coolant connection, with at least one, preferably two, particularly preferred all of these connections being directly connected to a respective connection at the power electronics module side. For example, the E-motor power connection, preferably also the electric signal and/or the clutch actuator connection, particularly preferred also the coolant connection are directly connected to a respective connection at the power electronics module side.

An E-motor power connection is preferably a connection, which guides electricity for the operation of the electric drive motor (E-motor) of the hybrid module, e.g., to the stator and/or the rotor of the E-motor. The E-motor connection is preferably a high power interface. It is preferably implemented to transmit electric power with a peak, preferably permanent power of at least 10 W, preferably at least 100 W, particularly preferred at least 1000 W or more. Preferably it is an E-motor power connection. Preferably the power for operating an E-motor is transmitted via the high power interface, with the high power interface preferably being designed for peak voltages, particularly alternating voltages of at least 48 V, particularly preferred at least 100 V, particularly preferred at least 350 V or more, each at currents up to 400 A.

An electric signal and/or coupling actuator connection is preferably a connection, conducting at least one signal line (e.g., for control and/or measuring signals, such as rotor position sensor signal, rotor speed sensor signal, temperature sensor signal, position sensor signal of the clutch actuator, control signal for the clutch actuator) and/or at least one voltage supply for the clutch actuator. This connection is preferably a low-power interface. It is preferably implemented to transmit control signals and/or electric power with a peak, preferably permanent power up to 100 W, preferably up to 10 W, particularly preferred up to 5 W. Preferably, control signals and/or sensor signals are transmitted via the low-power interface for the clutch and/or the E-motor and/or supply power for the actuating device of the clutch of the hybrid module.

A hybrid drive unit is preferably a combined drive unit with two different drive units, e.g., an internal combustion engine and an electric motor.

A power electronics module is preferably an assembly of various components, which controls or regulates a current to the E-motor of the hybrid module, preferably including peripheral components required, such as cooling elements or power packs. In particular, the power electronics module includes power electronic, for example one or more power electronics components implemented for controlling or regulating a current. It is particularly preferred that this relates to one or more power switches, e.g., power transistors. It is particularly preferred that the power electronic has more than two, particularly preferred three phases and/or current paths, separated from each other, each having at least one separate power electronics component. The power electronics component is preferably designed to control or regulate for each phase a power with a peak, preferably a permanent power of at least 10 W, preferably at least 100 W, particularly preferred at least 1000 W. Preferably the power electronics module is arranged at a component of the hybrid module, e.g., at a hybrid module housing, preferably at a component of the hybrid module located in the hybrid module housing, e.g., a stator sheet. Preferably the power electronics module is pre-assembled at the part of the hybrid module prior to the assembly of the hybrid module in the hybrid drive unit, e.g., before the assembly of the hybrid module in the motor compartment of a motor vehicle.

Preferably the power electronics module additionally comprises control electronics and/or sensor electronics for the hybrid module, e.g., a control device (e.g., ACU— actuator control unit) for the clutch actuator, e.g., electric central shifter. The power electronics module preferably comprises an electric signal and/or clutch actuator connection and/or a coolant connection, respectively connected directly to an appropriate connection at the hybrid module side.

The hybrid module can be operated via the power electronics module, preferably by the power electronics module conducting current into the hybrid module, e.g., at the stator coil of the E-motor.

At the hybrid module side preferably indicates that the part identified such is located with regards to the interface between the hybrid module and the power electronics module at the hybrid module side and that it is allocated to the hybrid module to this regard. At the power electronics module side indicates that the component identified such is located in reference to the interface between the hybrid module and the power electronics module at the power electronics module side and that it is allocated to the power electronics module to this regard.

A contact device is preferably a device, which in cooperation with another contact device forms a galvanic contact by a direct connection to the other contact device, i.e. preferably without any cable interposed between the contact devices. A contact device is preferably embodied as a plug-in device. A plug-in device preferably forms a plug-in connection. The plug-in connection preferably comprises at least one male element and/or at least one female element. Preferably the respective contact device is connected wirelessly to the power electronics module or the hybrid module. The contact device preferably comprises at least one power conducting element. Preferably the power electronic housing has a recess for the power conducting element at the power electronics module side and/or the hybrid module side. Preferably the hybrid module housing comprises a recess for the power conducting element at the power electronics module side and/or the hybrid module side.

For the direct connection preferably relates to the fact that the closed connections or parts (e.g., contact devices) of the closed connections are in contact, preferably with an interposed sealing element, particularly preferred exclusively with one interposed sealing element, or completely without any interposed part/element.

To the extent that in the following, in context with a module (e.g., hybrid module) a "respective" unit is mentioned, here reference is made to the unit of the respectively other module (e.g., power electronics module).

In another power electronics module according to the invention the contact device at the power electronics module side is fastened preferably directly, particularly preferred wirelessly, to the power electronics module. In a second variant of a hybrid module according to the invention the contact device at the hybrid module side is fastened at the hybrid module preferably directly, particularly preferred in a wireless fashion. In another method according to the invention the contact device at the power electronics module side is fastened at the power electronics module and/or the contact device at the hybrid module side is fastened at the hybrid module, each preferably directly, particularly preferred in a wireless fashion, before the contact devices are closed to each other.

This way it is possible to create a contacting point, e.g., installed in an integral fashion in the respective module or embodied as a fixed interface, which automatically generates a contact when the modules are assembled. The contact device is preferably screwed to the respective module and/or adhered or embodied in an integral fashion with the housing of the respective module. The respective contact device is fastened, e.g., rigidly or at least elastically at a part, e.g., housing of the respective module.

In another power electronics module according to the invention the power electronics module can be arranged at a part of the hybrid module, and by the arrangement of the power electronics module at the part said contact device at the power electronics module side can be made to contact, preferably engage the contact device at the hybrid module side. In a third variant of the hybrid module according to the invention the power electronics module can be arranged at a part of the hybrid module and by an arrangement of the power electronics module at the part the contact device at the power electronics module side it can be made to contact, preferably engage the contact device at the hybrid module side. In another method according to the invention, by arranging the power electronics module to the part, the contact device at the power electronics module side can be made to contact, preferably engage the contact device at the hybrid module side.

This way, a simple assembly and secure contacting is possible. Preferably, furthermore the stability of the connection between the hybrid module and the power electronics module is increased by the mutual engagement, e.g., the embodiment of the contact device as a plug-in device. Preferably the power electronics module is arranged at the hybrid module such that a mutual engagement is given of the contact devices. A part of the hybrid module, at which the power electronics module is or will be arranged, is e.g., the hybrid module housing, preferably a part of the hybrid module, e.g., a stator sheet, located in the hybrid module housing.

In another power electronics module according to the invention the contact device at the power electronics module side comprises at least one power conducting element at the power electronics module side, which is fastened directly at the power electronics module, which is galvanically coupled to a power electronics element of the power electronics module and which can directly contact a power conducting element at the hybrid module side. In a fourth variant of a hybrid module according to the invention the contacting device at the hybrid module side comprises at least one power conducting element at the hybrid module side, which is fastened directly at the hybrid module and galvanically coupled to a stator coil of the hybrid module, and which can directly contact a power conducting element at the power electronics module side. In another method according to the invention a power conducting element at the hybrid module side directly contacts a power conducting element at the power electronics module side.

This way, a stable galvanic connection is possible between the power electronic and the stator coil. Preferably a contact is given between the two power conducting elements. A power conducting element is preferably a power tab or a busbar. Preferably it has an opening for accepting fastening means, particularly a screw. E.g. it represents a metal sheet (particularly comprising copper), preferably angular, a pin (e.g., hollow pin or massive pin), or a sheath, which accepts the pin in a conductive fashion. Particularly preferred a power conducting element is at least elastically in a section, so that, e.g., simply by its elastic internal deformation during the engagement with the other power conducting element, pressure is applied upon the other power conducting element. Preferably several power conducting elements at the hybrid module side are galvanically coupled via a control circle to the stator coils. Preferably the power conducting element at the hybrid module side is at least partially insulated and/or injection coated with plastic. Preferably the power conducting element at the power electronics module side is screwed and/or soldered to a circuit board of the power electronics module. A power conducting element is preferably designed to conduct the electric motor current required for generating the drive torque. It is particularly preferred for a contact area to be located between a power conducting element at the hybrid module side and a power conducting element located at the power electronics module side in a plane with or parallel to the direction of assembly (e.g., preferably in the direction in which the power electronics module must be guided to connect to the hybrid module) of the power electronics module to the hybrid module.

Preferably the stator of the hybrid module comprises the contact device at the hybrid module side, preferably having three power conducting elements, which are switched to the coils of the stator, particularly preferably connected via control circuits. Preferably the power electronics module of the counter interface also comprises three power conducting elements, preferably coming radially from the bottom out of the power electronics module. Preferably, in the assembled state of the hybrid module (power electronics module is assembled) direct contacting is given between the power conducting element at the hybrid module side and the power electronic side via a plug-in connection, preferably a threaded connection. In case of higher currents/powers a threaded connection is preferred, because it ensures an even better contacting.

In another power electronics module according to the invention the power conducting element at the power electronics module side and the power conducting element at the hybrid module side can be compressed to each other via fastening means. In a fifth variant of the hybrid module according to the invention, particularly based on a fourth variant, the power conducting element at the power electronics module side and the power conducting element at the hybrid module side can be compressed to each other via fastening means. In another method according to the invention the two power conducting elements are compressed to each other.

This way, an even more secure galvanic contact is generated, protecting from vibrations. Preferably the power conducting elements are compressed towards each other via fastening means. Preferred fastening means are here those which apply pressure upon one or both power conducting elements. It is e.g., a screw, which can simultaneously be guided through an opening in both power conducting elements and via a nut or a thread (e.g., M8), in which the screw is rotationally inserted, pressure can be applied at both sides upon the power conducting elements. Or it represents a spring or an elastic element or a snap mechanism or a latch mechanism or a bolt, for example, preferably having a sectionally conical external contour. It is particularly preferred for the fastening element to generate a form-fitting connection between itself and the respective module and/or the power conducting elements. Preferably, the pressure applied by the fastening element upon the power conducting elements leads to a pressure in the axial direction (with regards to the axis of the rotor of the E-motor), particularly preferred in a direction perpendicular to the axial direction (e.g., a radial direction). Preferably the contact device has one or more threads, preferably one thread per E-motor phase, for screwing in a thread guided through an opening of a power conducting element. Preferably the inserted screw is arranged radially in reference to the rotor of the E-motor or perpendicular in reference to an axial direction.

In another power electronics module according to the invention it has a power electronics housing with an assembly opening that can be sealed via a sealing cover, by which the fastening means can be accessed with a tool for the application of the fastening means. In a sixth variant of the hybrid module according to the invention, particularly based on the fifth variant, the hybrid module housing has an assembly opening that can be sealed via a sealing cover, by which the fastening means can be accessed with a tool to apply the fastening means. In another method according to the invention the fastening means is applied through an assembly opening in the housing of the hybrid or power electronics module via a tool and the assembly opening is then sealed via a sealing cover.

This way, a simple assembly is possible with an easy subsequent sealing of the respective module from the environment. The power electronic is preferably arranged in the power electronics housing. Preferably the power electronics housing is implemented to completely encompass the power electronic. A sealing cover is a cap, for example. The sealing cover preferably comprises a sealing element, e.g., a rubber coating or a plugged-on O-ring. The application of a fastening means is preferably understood as the application or activation of the fastening means. E.g., this represents screwing in a screw via a screw-driving tool or the prestressing of a spring or impressing of a snap or latch mechanism.

In another power electronics module according to the invention the power conducting element at the power electronics module side and/or the power conducting element at the hybrid module side extend through an opening formed by a sealing contact, with the sealing contact representing a sealing of the power electronics module from an outer chamber surrounding the hybrid module and/or from an inner chamber of the hybrid module. In a seventh variant of a hybrid module according to the invention, particularly based on the variants 4 to 6, the power conducting element at the power electronics module side and/or the power conducting element at the hybrid module side extend through an opening formed by a sealing contact, with the sealing contact representing a sealing of the power electronics module from an exterior chamber surrounding the hybrid module and/or from an inner chamber of the hybrid module. In another method, at least one power conducting element is guided through an opening formed by a sealing contact.

This way, the guidance of the power conducting element through the housing of the respective module is sealed, e.g., from leaking coolant or penetrating dirt. A sealing contact, preferably a sealing area, is preferably a contact sealing in reference to liquid and/or air between two parts contacting each other, e.g., between the power electronics housing and the hybrid module housing. Preferably the sealing contact is generated with an interposed sealing element, e.g., a sealing ring/bead or a sealing sheath with one or more sealing areas. An opening formed by a sealing contact is e.g., the area inside the sealing contact. Preferably the opening formed by the sealing contact overlaps the housing opening of the respective module.

Particularly preferred, the hybrid module housing has a wall section for arranging the power electronics housing. The wall section preferably has a recess, in which the power conducting element at the power electronics module side, preferably several ones, particularly preferred three power conducting elements at the power electronics module side can be inserted and here contact the power conducting element at the hybrid module side, preferably several ones, particularly preferred three power conducting elements at the module side. Preferably a sealing sheath is inserted in the recess, which has at least one, preferably several, particularly preferred two circumferential sealing elements at its exterior. Preferably, the sealing sheath has an inner opening, preferably a longitudinal gap, in which at least one, preferably several, particularly preferred three power conducting elements at the power electronics module side can be guided through. Preferably a first circumferential sealing element seals the sheath from the walls section, particularly preferred another circumferential sealing element seals the sheath from an E-motor power connection at the hybrid module side, integrated preferably in a stator covering. Preferably the sealing sheath, preferably via screws, is fastened at the wall sections. It is particularly preferred that the wall section forms a cover of the power electronic housing. The power electronics housing has preferably an opening, with its opening brim being arranged and preferably fastened at the wall section, preferably with a sealing element, preferably inserted therebetween and circumferential in reference to the opening.

In another power electronics module according to the invention the sealing contact is generated via a sealing element, which can be pre-stressed or is pre-stressed via a latch mechanism and/or via a securing means and/or via a screw connection towards the wall of the hybrid module housing or a power electronics housing. In an eighth variant of a hybrid module according to the invention, particularly based on the seventh variant, the sealing contact is generated with a sealing element, which can be pre-stressed or is pre-stressed via a latch mechanism and/or via a securing means and/or via a screw connection towards a wall of the hybrid module housing or a power electronics housing. In another method according to the invention a sealing contact is generated by a sealing element being pre-stressed via a latch mechanism and/or via a securing means and/or via a screw connection towards a wall of the hybrid module housing or a power electronics housing.

This way, an easy assembly and secure sealing of a housing of the respective module is possible in the proximity of the penetration of the power conducting element. A sealing element is e.g., a sealing ring/bead or a sealing sheath with one or more sealing areas. It is made e.g., from plastic or rubber. Particularly preferred, it is elastically at least in sections. It has e.g., at least one, preferably two, particularly preferred several, preferably opposite each other positioned snap fits for pre-stressing via the latch mechanism and/or at least one groove or a projection to accept the securing means (securing means: e.g., tension spring or securing hooks/rings/splints) for pre-stressing via the securing means and/or via at least one, preferably two openings to accept screws for a pre-stressing via a screw connection.

In another power electronics module according to the invention the power conducting element at the power electronics module side represents an electrically conducting sheet or an electrically conducting rigid pin. In a ninth variant of the hybrid module according to the invention, particularly based on variants 4 to 8, the power conducting element at the hybrid module side is an electrically conducting sheet or an electrically conducting rigid pin.

This way, high electric resilience with simultaneously high mechanical stability is possible. Preferably the sheet or the pin or the sheath has an opening, by which a threaded connection of the two power conducting elements is possible. Preferably the sheet is elastic, at least in sections.

In another power electronics module according to the invention it is arranged at a part of the hybrid module, preferably a hybrid module according to the invention. In an eleventh variant of the hybrid module according to the invention a power electronics module is arranged at a part of the hybrid module, preferably a power electronics module according to the invention. In another method according to the invention a power electronics module and a hybrid module are arranged at each other, with at least one of the modules representing a module according to the invention.

BRIEF DESCRIPTION OF THE DRAWINGS

In the following, the invention shall be explained by an example, based on the figures. Shown are.

DETAILED DESCRIPTION OF THE PREFERRED EMBODIMENTS

Figure 1:
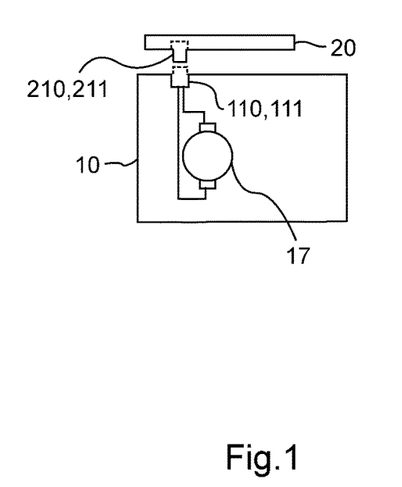
FIG. 1 an illustration of the principle of a hybrid module according to the invention and a power electronics module according to the invention with respectively an E-motor power connection and corresponding contact devices, FIG. 2 an illustration of the principle of a hybrid module according to the invention and a power electronics module according to the invention based on FIG. 1 with respective power conducting elements, contacting each other according to a first variant, FIG. 3 a perspective view of such a stator, which could be used according to the principle shown in FIG. 2, FIG. 4 a cross-section of a hybrid module according to the invention and a power electronics module according to the invention based on FIG. 2 prior to the mutual assembly, FIG. 5 a cross-section of a hybrid module according to the invention and a power electronics module according to the invention based on FIG. 4 after the mutual contacting of the contact devices and prior to the application of the fastening means, FIG. 6 an illustrated detail of FIG. 5, with unlike FIG. 5, a variant is shown with flat seals, FIG. 7 an illustration of the principle of a hybrid module according to the invention and a power electronics module according to the invention based on FIG. 1, with respective power conducting elements, which are mutually contacted according to a second variant, FIG. 8 a perspective view of a stator of FIG. 7, FIG. 9 an illustrated detail of the contact device of the stator of FIG. 8 at the hybrid module side, FIG. 10 an illustrated detail of the contacting of the power conducting elements according to FIG. 7, FIG. 11 a cross-section of a hybrid module according to the invention and a power electronics module according to the invention based on FIG. 7 after the mutual connection of the contact devices and after the application of the fastening means, FIG. 12 an illustration of a detail of the sealing, using the variant shown in FIGS. 7 to 11 as examples, via sealing elements, with here the sealing elements being pre-stressed via screw connections against the walls of the hybrid module housing, FIG. 13 an illustrated detail similar to FIG. 12, with the sealing element being pre-stressed via a latch mechanism against the wall of the housing of a hybrid module, FIG. 14 a top view of the lower sealing element of FIG. 13, without the stator being shown, FIG. 15 an illustrated detail similar to FIG. 12, with a sealing element being pre-stressed via a tension spring against the wall of the housing of the hybrid module, FIG. 16 variants of the safety means according to FIG. 15 with and without assembly/disassembly ears, FIG. 17 a top view of the contact devices at the hybrid module side with sealing elements according to FIG. 15 and a sealing element according to the third variant in FIG. 16, FIG. 18 a top view of the sealing elements according to FIG. 17 without the stator being shown, FIG. 19 a perspective view of a hybrid module according to the invention prior to the assembly, and FIG. 20 a perspective view of a power electronics module according to the invention, preferably for the hybrid module according to FIG. 19.

FIG. 1 shows the illustration of the principle of a hybrid module 10 according to the invention and a power electronics module 20 according to the invention with respectively an E-motor power connection 110 and/or 210 and corresponding contact devices 111 and/or 211 for an E-motor 17. The contact devices 211 and 111 can mutually contact each other. Preferably at least one, preferably two contact devices 111, 211 are fastened to the corresponding module, e.g., rigidly or at least elastically fastened to the respective housing or embodied in an integral fashion with the respective housing. The contact between the contact devices 121, 221 is located at the hybrid module side. A variant is shown in dot-dash lines in which this contact is located on the power electronics module side 22.

During the assembly of the hybrid module the contact devices 111 and 211 are made to contact each other, preferably by the power electronics module 20 being arranged at the hybrid module 10, e.g., fastened thereat.

This way, a secure, electrically resilient, and easily assembled contacting is possible for the E-motor power between the power electronics module 20 and the hybrid module 10, with the high voltage and/or high power wiring being reduced to a minimum or even eliminated entirely (e.g., in contact devices fastened at the modules).

Figure 2:
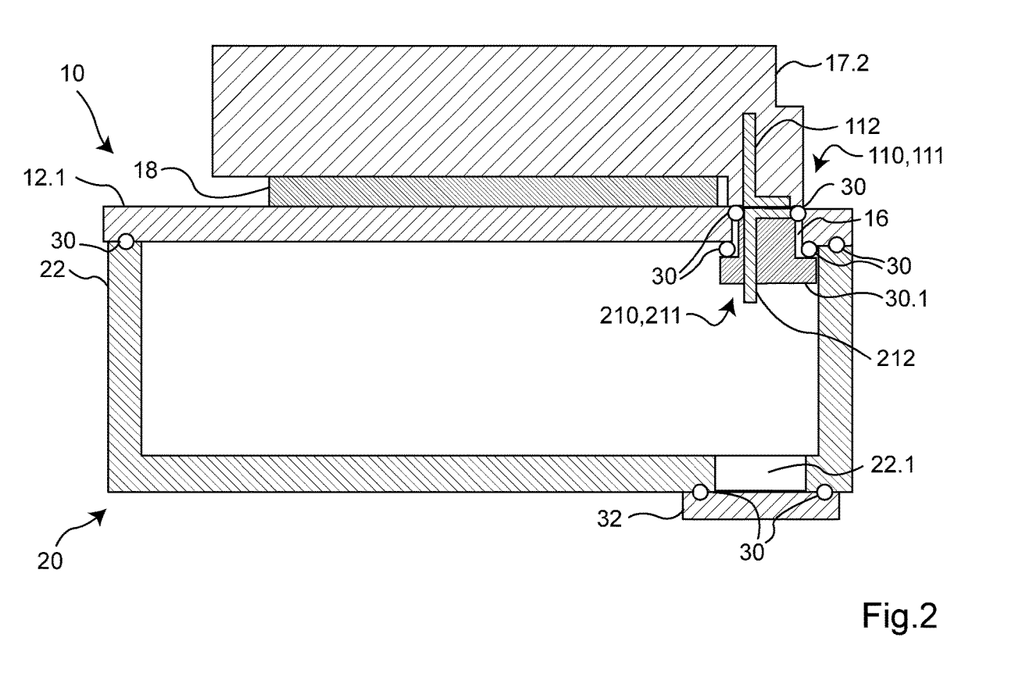

FIG. 2 shows an illustration of the principle of a hybrid module 10 according to the invention and a power electronics module 20 according to the invention based on FIG. 1 with respective power conducting elements 112 and 212, which contact each other according to the first variant. The E-motor connection 110 at the hybrid module side is at least partially integrated in the stator 17.2. The housing 12.1 of the hybrid module has a recess 16 and/or housing opening for a feedthrough. The power conducting element 112 at the hybrid module side and the power conducting element 212 at the power electronics module side, here embodied as power tabs, have a common contact area, which is positioned tangential in reference to the rotor axis of the E-motor, i.e. preferably in a tangential space. The power electronics module 10 has a power electronic housing 22, which is arranged at the hybrid module housing 12.1, optionally sealed via one or more, preferably circumferential sealing elements 30. Optionally the hybrid module has a cooling channel 18 between the stator 17.2 and a wall of the hybrid module housing 12.1. Preferably the power conducting element 212 at the hybrid module side extends through an opening of the hybrid module housing 12.1, here a recess 16. Preferably it also extends through an opening formed by a sealing contact. The sealing contact is given between sealing elements 30 and the hybrid module housing 12.1. The sealing elements 30 represent sealing lips of a sealing sheath 30.1. The sealing lips serve particularly for sealing the inner chamber of the power electronic housing 22 from an outer chamber and from the cooling channel 18. Optionally, the power electronic housing 22 comprises a sealing cover 32 with one or more sealing elements 30, which can be removed for the assembly of the power electronics module 20 at the hybrid module 10 and covers an assembly opening 22.1, which is positioned opposite the power conducting element 212 at the power electronics module side, preferably (radially) opposite underneath thereof.

During the assembly of the hybrid module, particularly the power conducting elements 112 and 212 of the contact devices 111 and 211 are made to contact each other. In this variant, particularly a radial screw-connection of the power conducting elements 112 and 212 is provided, particularly radially from the bottom. Here, preferably after the tightening of the screw(s) the sealing cover 32 is placed upon the power electronic housing 22. For sealing of the penetrating site of the power conducting elements 112 and 212, the sealing sheath 30.1 is pre-assembled from the bottom as a cover incl. sealing elements 30 at the hybrid module housing 12.1, before the power electronics module 20 is flange-mounted to the hybrid module 10. The sealing elements 30 at the sealing sheath 30.1 seal on the one side towards the housing wall of the hybrid module and on the other side towards the contact unit 110 of the stator 17.2.

This way, a simpler and more secure (because it is sealed) connection of the E-motor of the hybrid module is possible to the power electronic of the power electronics module.

Figure 3:
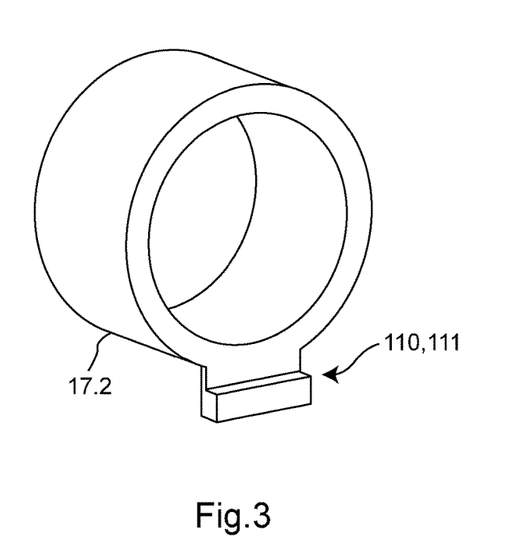

FIG. 3 shows a perspective view of such a stator 17.2, which could be used according to the principle shown in FIG. 2. It has an E-motor power connection 110 with a contacting device 111. The contacting device 111 is integrated in the stator casing and has two, preferably three or more power conducting elements 112, each of which respectively has a contact area pointing radially outwardly or located in a tangential space, allowing contact with a power conducting element 212 at the electronics module side. The power conducting elements 112 are galvanically coupled to the coils of the stator 17.2, preferably via control circuits.

Figure 4:
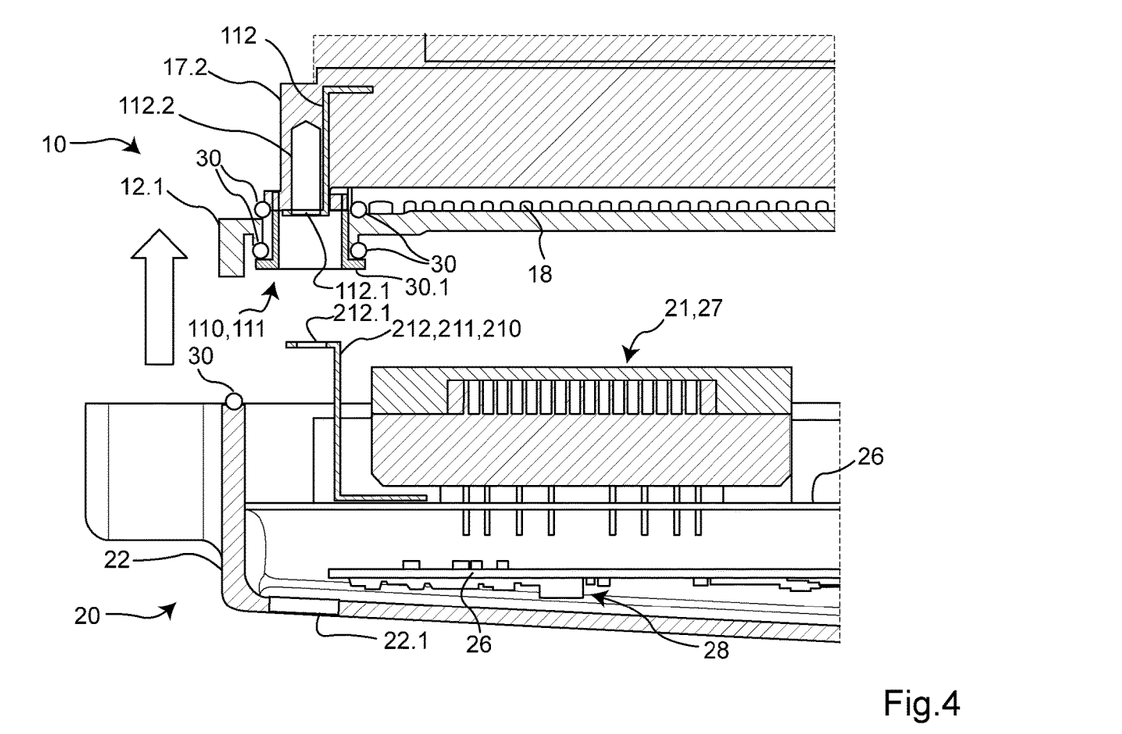

FIG. 4 shows a cross-section of a hybrid module 10 according to the invention and a power electronics module according to the invention based on FIG. 2 prior to the assembly. The power conducting elements 112, 212 have here respectively an opening 112.1 and/or 212.1, by which the power conducting elements 112, 212 can be fastened to each other. The E-motor power connection 210 at the hybrid module side has a hole, preferably a blind hole 112.2, in which preferably a thread is inserted. Alternatively or additionally a thread is given in the opening 112.1. The blind hole 112.2 overlaps the opening 112.1. The power conducting elements 112, 212 are angular sheets. The power conducting element 112 at the hybrid module side may alternatively also represent a sheath 112.2 encompassing the blind hole or be made from material surrounding the blind hole 112.2. The power conducting element 212 at the power electronics module side is fastened at a circuit board 26 and connected galvanically to the power electronic 21, which preferably has also a cooling device 27. Preferably another circuit board 26 is provided, arranged on the control and/or measuring electronic 28. The power electronic housing 22 has an assembly opening 22.1 at the bottom.

For the assembly, the power electronics module 20 approaches the hybrid module 20 from the bottom until the housings 22 and 12.1 and the power conducting elements 212 and 112 come into contact.

Figure 5:
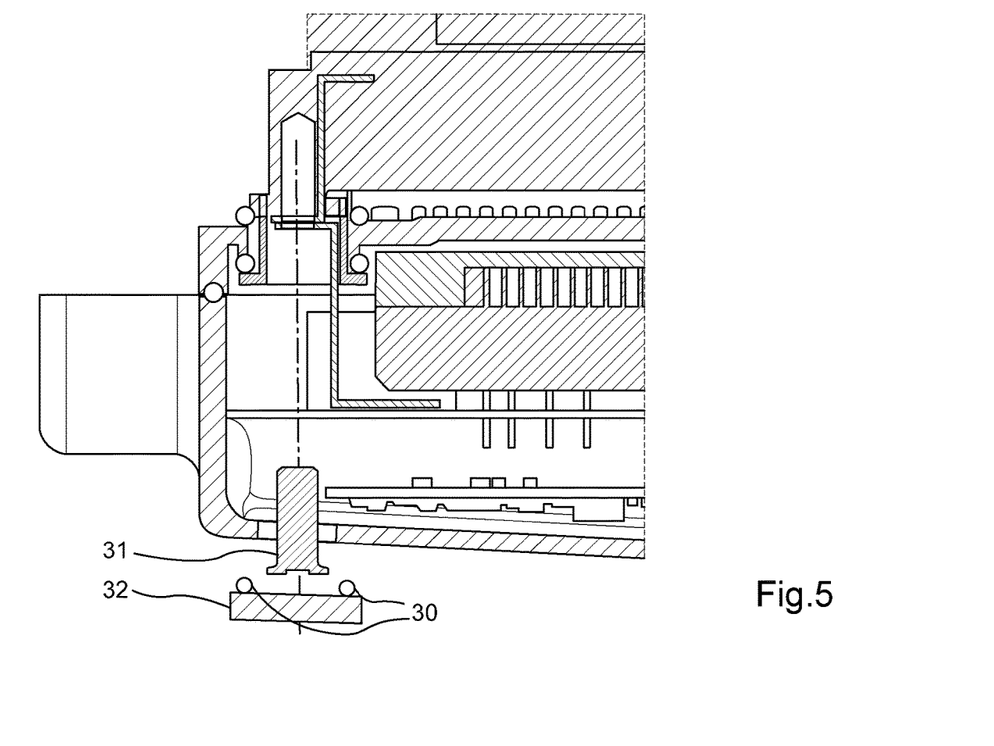

FIG. 5 shows a cross-section of a hybrid module 10 according to the invention and a power electronics module according to the invention as shown in FIG. 4 after the mutual connection of contact devices 110, 210, and prior to applying the fastening means 31. The components of FIG. 4 are here present identically. The reference characters are not repeated for the purpose of a clear illustration. Now, a screw is guided as a fastening means 31 through the assembly opening 22.1 into the openings 112.1 and 212.1 and tightened with a tool, so that the screw is accepted ultimately primarily inside the blind hold 112.2 and the power conducting elements 112 and 212 compress their contact areas. Finally, the assembly opening 22.1 is closed via a sealing cover 32 with a sealing element 30.

Figure 6:
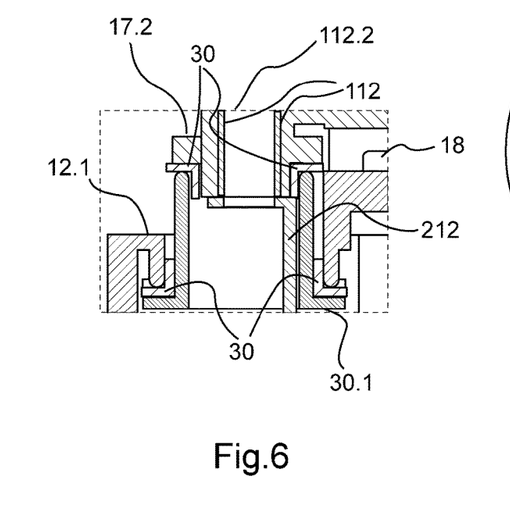

FIG. 6 shows an illustrated detail of FIG. 5, with unlike in FIG. 5, here a variant is shown with flat seals as the sealing elements 30. The flat seals are applied on a sealing sheath 30.1; alternatively they may also be embodied integrally with the sealing sheath 30.1. In this example, an alternative already mentioned regarding FIG. 4 is shown, in which the power conducting element 112 at the hybrid module side is formed by the material surrounding the blind hole 112.2. The galvanic contact develops here in a particularly advantageous fashion over a large area via the fastening means used (e.g., screw or bolt). However, another power conducting element 112 may be used as well, e.g., as shown in FIG. 4.

Figure 7:
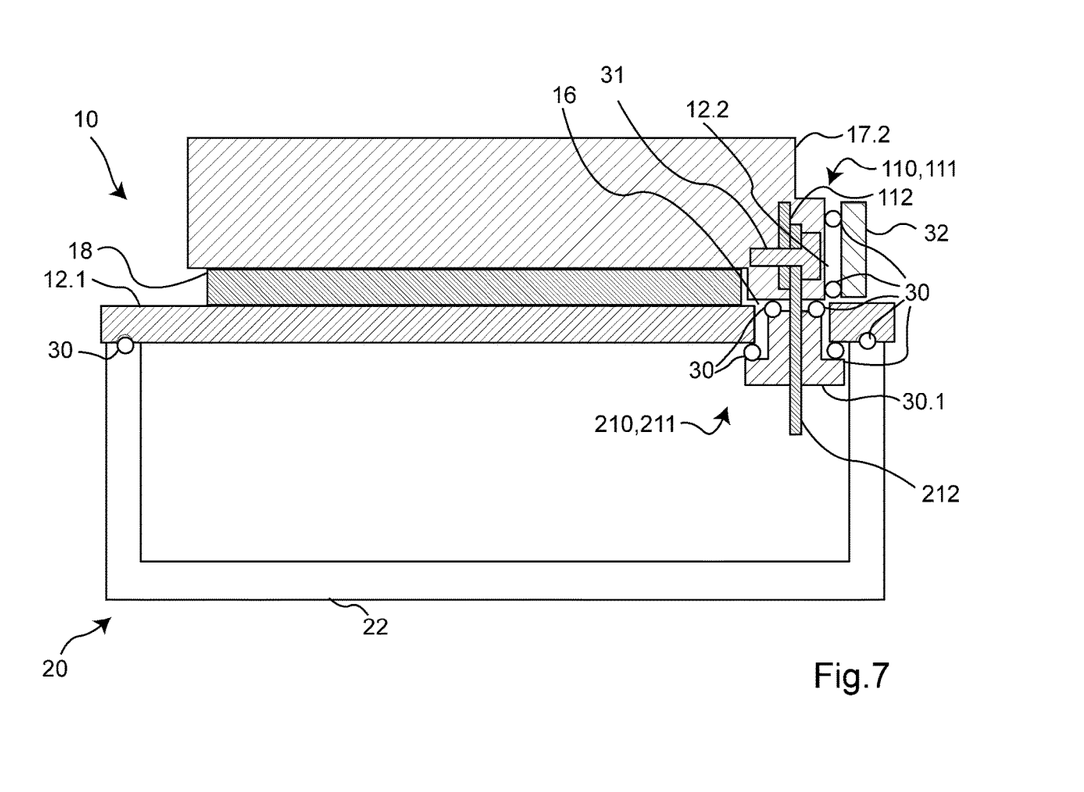

FIG. 7 shows the illustration of the principle of a hybrid module 10 according to the invention and a power electronics module 20 according to the invention based on FIG. 1, each having power conducting elements 112 and 212 which contact each other according to a second variant. The contact area between the power conducting elements 112 and 212 is located in a plane with a direction of assembly of the power electronics module 20 at the hybrid module 10, here approximately in a plane perpendicular in reference to the axial direction (with regards to the axis of the E-motor). The power conducting element 212 at the power electronics module side is inserted in a gap, which is present next to the power conducting element 112 at the hybrid module side. Here a straight gap is shown (not tapering). Both power conducting elements 112 and 212 each have openings and are compressed to each other in the axial direction via a screw as the fastening means 31. A sealing cover 32 closes the assembly opening 12.2. Alternatively, a conical (tapering) gap is provided and an axial pressure of the power conducting elements 112, 212 towards each other develops already by an insertion of the power conducting element 212 at the power electronics module side into the gap. The other components have already been described in the context with FIG. 2. Preferably the gap is embodied in every case (with and without fastening by fastening means) in a conical fashion so that an insertion ramp develops.

Unlike the variant according to FIG. 2 the screw-connection of the power conducting elements 112, 212 occurs axially, preferably axially from the rear. This is more advantageous with regards to dirt penetration into the power electronics module during the screwing process because only the power tabs 212 (and no other parts) of the power electronics module 20 are exposed. They are inserted into the contact unit 110 at the hybrid module side. The optional insertion ramp facilitates the process and already ensures a mutual compression of the power conducting elements 112, 212. After the screw connection of the power conducting elements 112, 212 has been established, the contacting is closed via the sealing cover 32 incl. sealing elements 30.

This way an alternative means for contacting is possible which protects the power electronics even better from soiling during the assembly. Particularly advantageous is also a secure contacting without screws, via a conical gap, because this way the assembly expense is further reduced.

Figure 8:
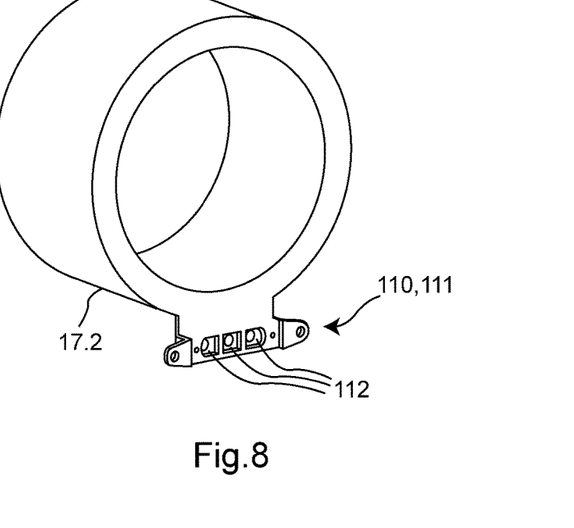
Figure 9:
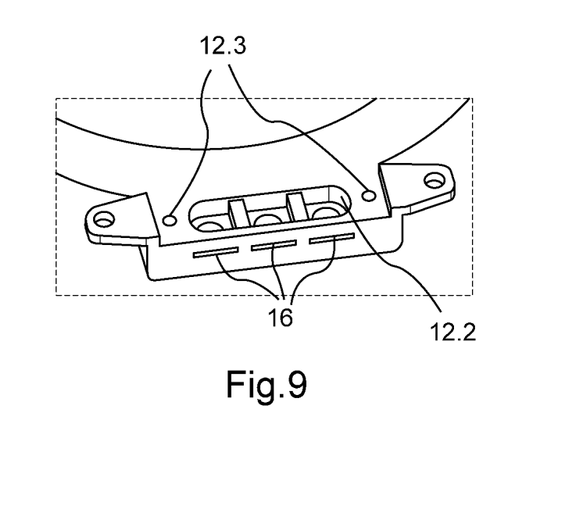

FIG. 8 shows a perspective view of a stator 17.2 of FIG. 7 similar to FIG. 3, and FIG. 9 shows a detail of a contact device of the stator 17.2 of FIG. 8 at the hybrid module side.

Contrary to FIG. 3, this stator comprises power conducting elements 112, which have contact areas aligned perpendicularly to the axial direction. The contact device 110 has an assembly opening 12.2 at a covering, into which fastening means 31 can be inserted, coming from an axial direction. Furthermore, it comprises recesses 16 in the covering, into which power conducting element 212 at the power electronics module side can be inserted, coming from a direction perpendicular to the axial direction (e.g., radial direction). Further it has optional bore holes 12.3 for fastening a sealing element 30 or a sealing sheath 30.1. Three power conducting elements 112 are given.

Figure 10:
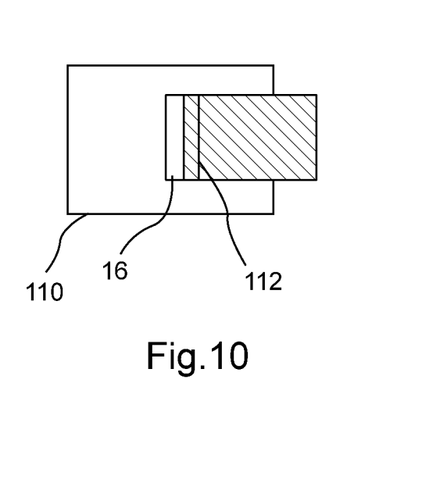

FIG. 10 shows in an illustrated detail the contacting of the power conducting elements according to FIGS. 7 to 10. By the recess 16, in addition to the power conducting element 112 at the hybrid module side, an empty cavity and/or gap can be accessed via the recess 16 for the power conducting element 212 at the power electronics module side.

Figure 11:
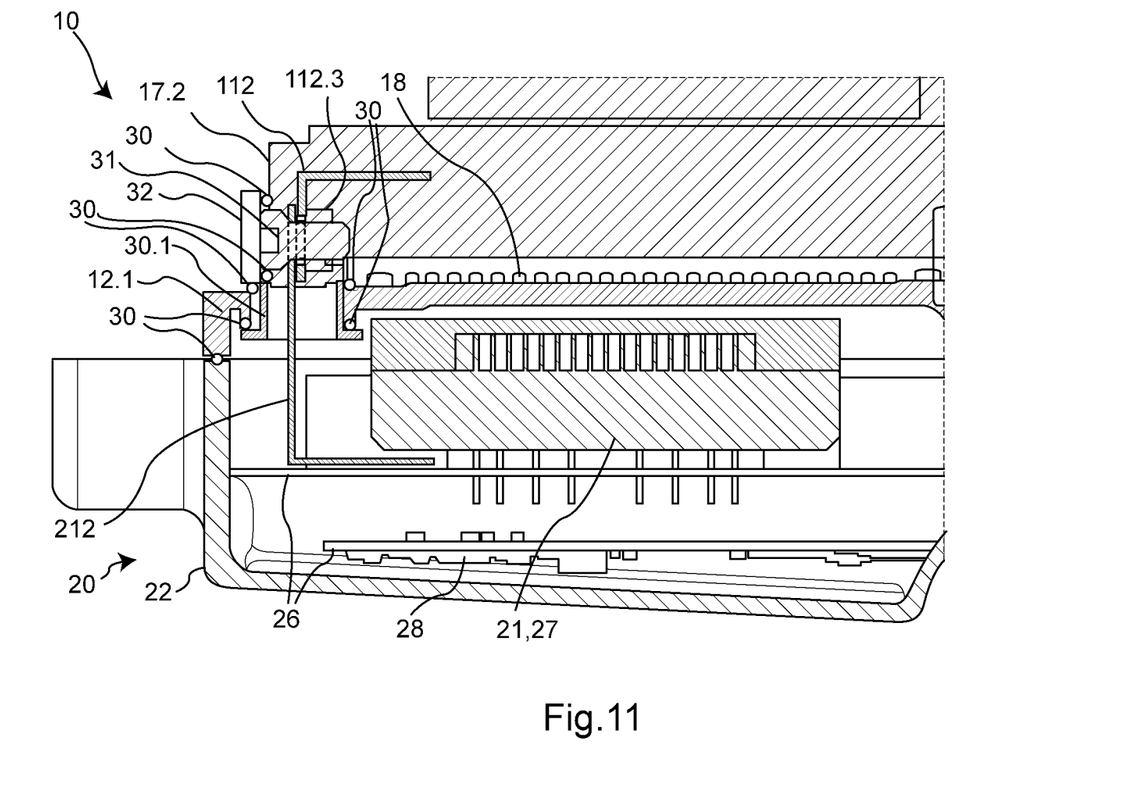

FIG. 11 illustrates a cross-section of a hybrid module 10 according to the invention and a power electronics module 20 according to the invention as shown in FIG. 7 after the mutual connection of the contact devices 111, 211 and after the application of the fastening means 31. Largely the same components are indicated as also in FIG. 7 and partially in FIG. 4. Here, too, the power conducting elements 112 and 212 comprise openings 112.1 and 212.1, which are indicated in dot-dash lines and are not marked with reference characters for reasons of clarity. Furthermore, a nut 112.3 is provided, injection molded in the stator 17.2.

In both variants (FIGS. 2-6 and FIGS. 7-11) different sealing concepts may be given in the sealing sheath 30.1:

Radial seal from the hybrid module housing 12.1 and radial seal from a covering of the contact device 110;

Radial seal from the hybrid module housing 12.1 and axial seal from a covering of the contact device 110;

Axial seal from the hybrid module housing 12.1 and radial seal from a covering of the contact device 110;

Axial seal from the hybrid module housing 12.1 and axial seal from a covering of the contact device 110.

Not all variants have been illustrated. Depending on the tolerance of the components, some combinations may have more optimal features with regards to sealing effects. The sealing cover 32 may be fastened in many ways, depending on the variant, particularly radially from the bottom. Here, screwed, clipped, or clamped connections via a catch spring are possible (see slides 11 and 12).

Figure 12:
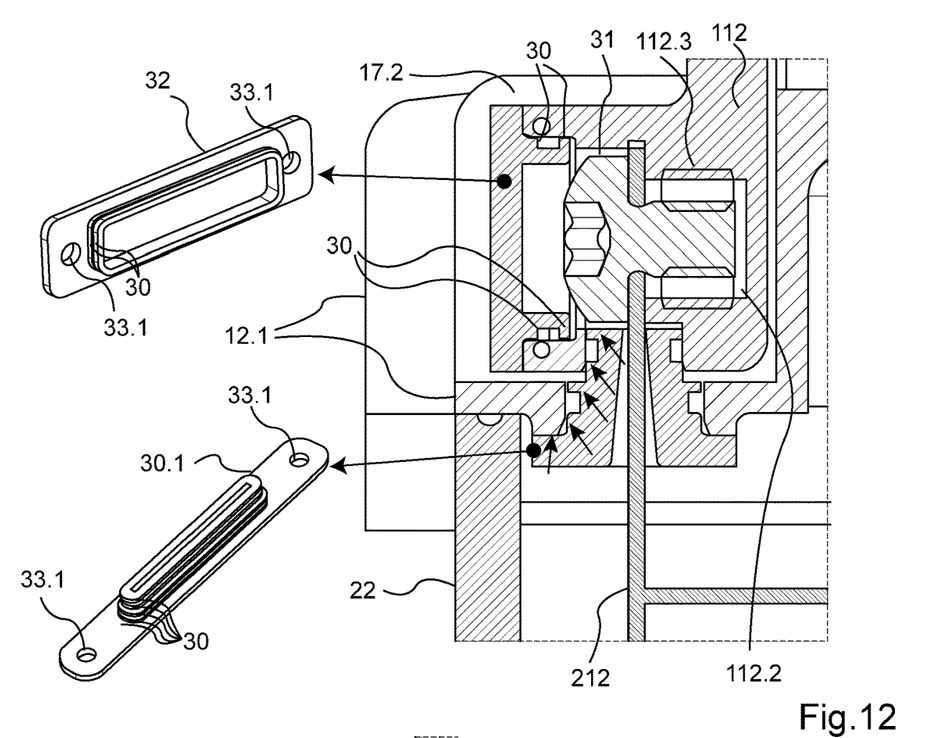

FIG. 12 displays an illustrated detail of the seal using the variant shown as an example in FIGS. 7 to 11 via sealing elements 30, with the sealing elements 30 being pre-stressed via screws against the walls of the hybrid module housing 12.1. The sealing cover 32 has two circumferential sealing lips as sealing elements 30, forming a radial seal of the power conducting element—screw connection, as well as bores 33.1 for a respective screw connection. The integrally embodied, circumferential sealing elements 30 of the sealing sheath 30.1 are marked with arrows, which consequently are present mirror-reflected on the other side of the sealing sheath 30.1. The lowermost three sealing elements form at least one sealing contact towards the housing 12.1 of the hybrid module and/or at least one sealing contact, which seals from the inner chamber of the power electronics module 20. The uppermost two sealing elements of the sealing sheath 30.1 form at least one sealing contact to the housing of the contact device 110 at the hybrid module side. The upper four sealing elements form a radial seal, the lowermost sealing element forms an axial seal. This axial seal is advantageously embodied in a strong fashion via screws through the bore holes 33.1 of the sealing sheath 30.1, while the radial seals, depending on tolerances, are embodied more or less strongly.

Figure 13:
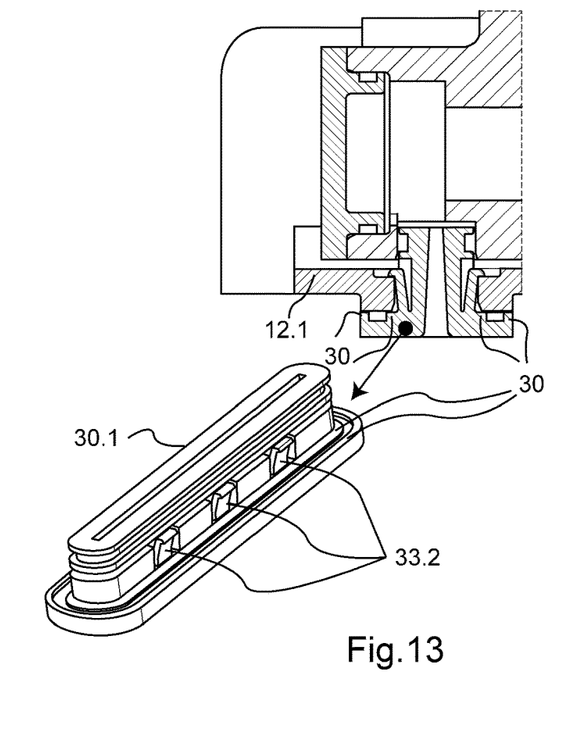
Figure 14:
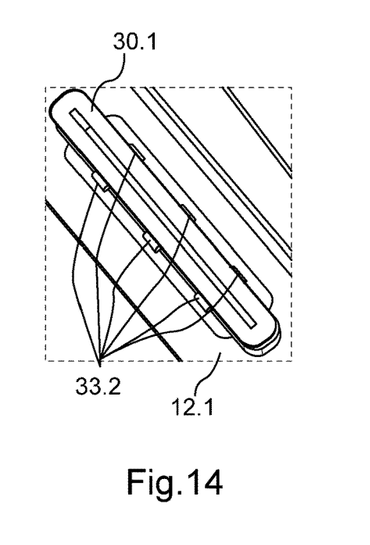

FIG. 13 shows a detailed illustration similar to FIG. 12, with a sealing element 30 being pre-stressed via a latch mechanism against the wall of the hybrid module housing 12.1. FIG. 14 shows a top view of the bottom sealing element 30 of FIG. 13 without a representation of the stator. Instead of the screw connection, the pre-stressing of the sealing sheath 30.1 is yielded via six snap fits 33.2, positioned oppositely in pairs, allowing the application of an even pre-stressing upon the axial seal over the circumference of the sealing sheath 30.1

Figure 15:
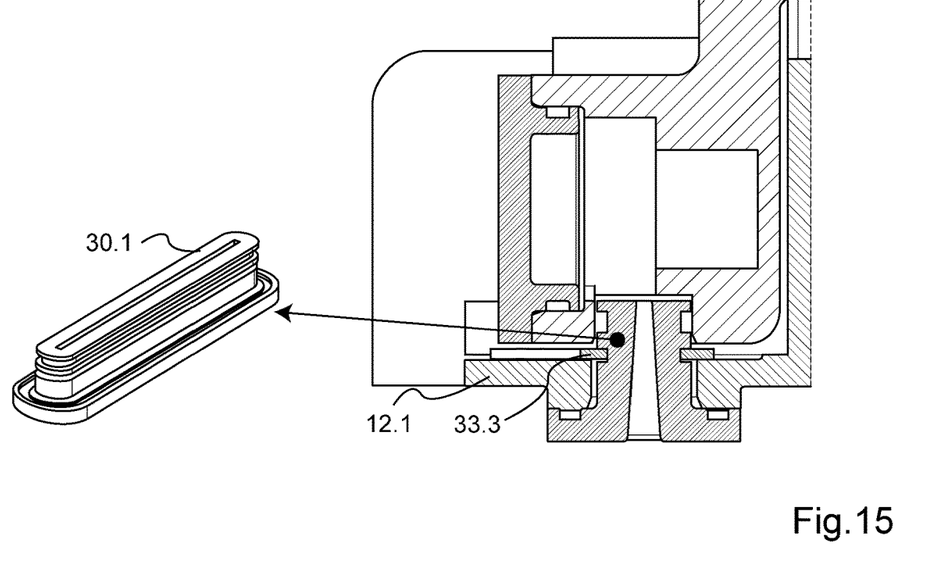

FIG. 15 shows an illustrated detail similar to FIG. 12, with a sealing element being pre-stressed via a tension spring provided as the securing means 33.3 against the wall of the hybrid module housing 12.1. The tension spring contacts a projection of the sealing sheath 30.1. Here, an easier disassembly is advantageous in reference to the variant with the snap fits, and simultaneously a more homogenous pre-stressing upon the axial seal.

Figure 16:
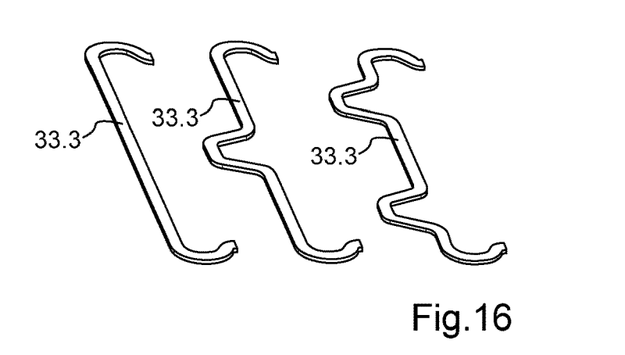

FIG. 16 shows variants of the safety means 33.3 according to FIG. 15 with and without any assembly/disassembly ears. The pre-tension spring 33.3 according to the first variant has none, the one according to the second variant has one disassembly ear, and the one according to the third variant has two disassembly ears.

Figure 17:
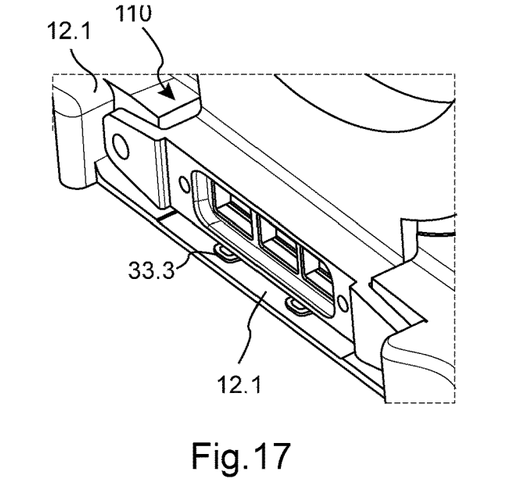

FIG. 17 shows a top view of the contact device 110 at the hybrid module side with sealing elements according to FIG. 15 and a securing means 33.3 according to the third version of FIG. 16 with two disassembly ears.

Figure 18:
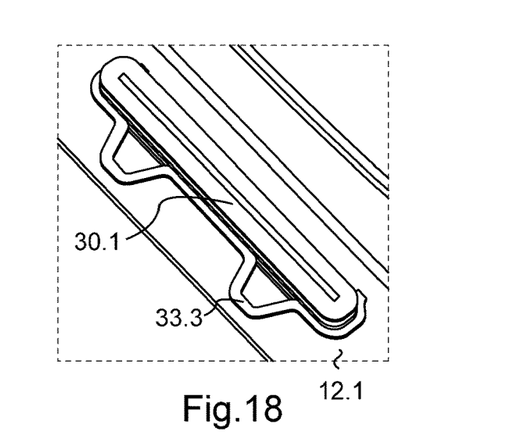

FIG. 18 shows a top view of the sealing elements according to FIG. 17 present at the sealing sheath 30.1 without the stator being shown.

In the variants with the disassembly ears (FIGS. 16-18) it is advantageous that they allow an even easier disassembly. In case of two disassembly ears it is easiest, because particularly the pre-stressing of the pre-tension spring can be released more easily.

Figure 19:
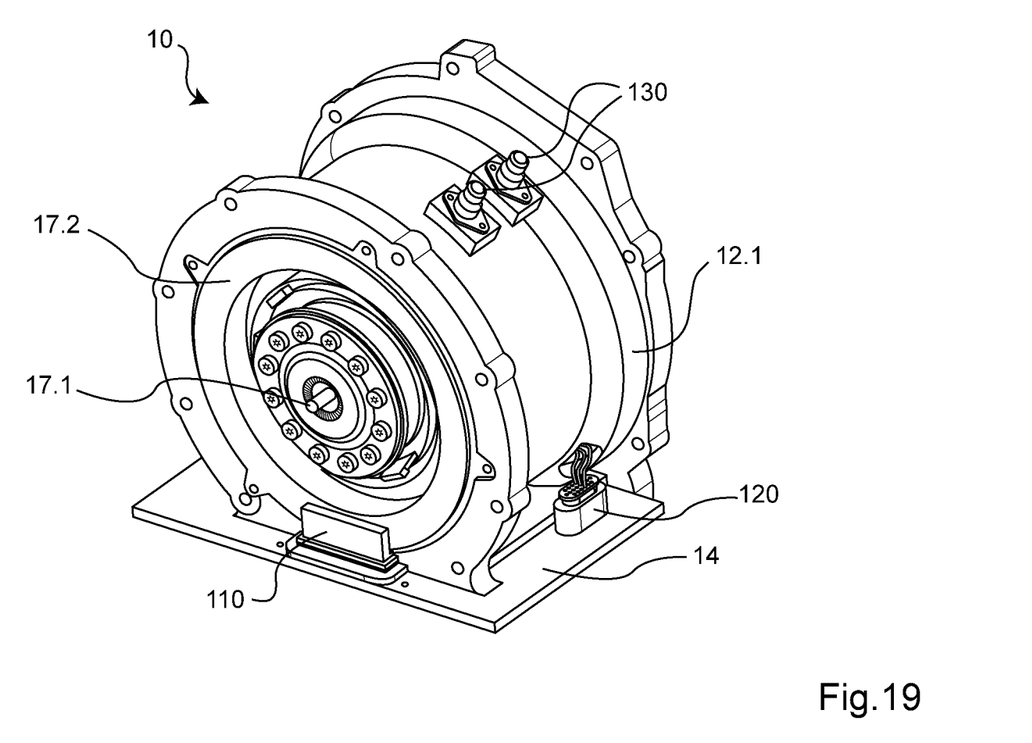

FIG. 19 shows a perspective view of a hybrid module 10 according to the invention based on FIG. 1 or another of the previous figures prior to the assembly. Connections are provided at the wall section 14 sealed towards the interior of the hybrid module: an E-motor current connection 110 at the hybrid module side and an electric signal and/or clutch actuator connection 120 at the hybrid module side. Further the hybrid module 10 has two coolant connections 130 at the hybrid module side. In this figure additionally the rotor 17.1 and the stator 17.2 of the hybrid module 10 are shown as well.

In a simple fashion a power electronics module 20 can be arranged radially outside the rotor 17.1 and the stator 17.2 in a space-saving fashion at this hybrid module 10, e.g., shown in FIG. 2, 4, 5, 7 or 11.

Figure 20:
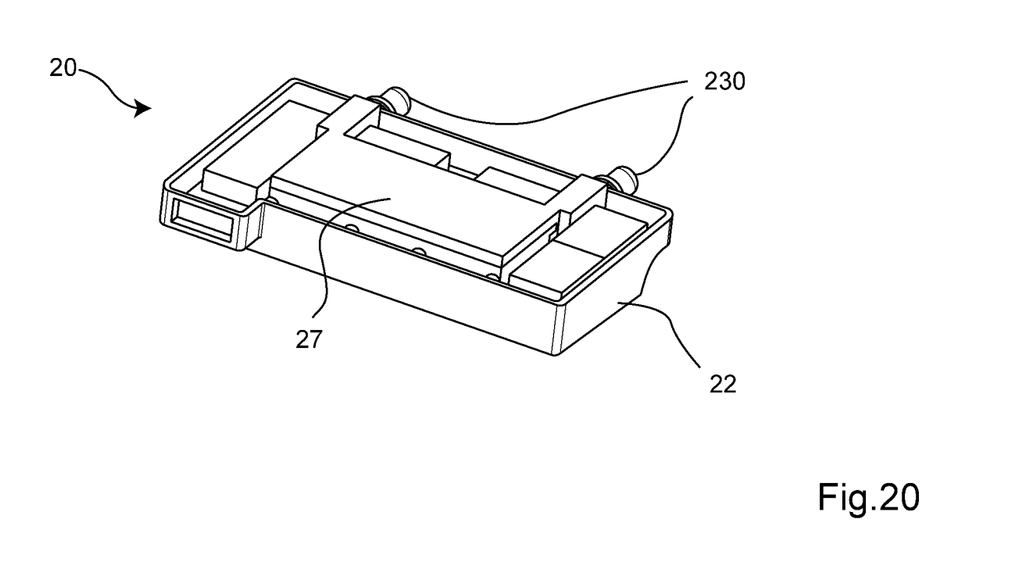

FIG. 20 shows a perspective view of a power electronics module 20 according to the invention based on FIG. 1 or another one of the previous figures, preferably for the hybrid module 10 according to FIG. 19 prior to assembly. It comprises a cooling device 27, which is arranged between two cooling connections 230 inside the power electronics housing 22, on the side of the circuit board facing the hybrid module. The power electronic is covered by the cooling device 27.

With the following invention therefore a direct contacting of the high-voltage connection of the power electronic to the hybrid module is presented for the first time. For this purpose, particularly at the sides of the hybrid module, recesses are provided at the stator and at the sides of the power electronics module electric current tabs are provided, which can engage the recesses. The electric current tabs are preferably screw-connected. Preferably the screw connection is subsequently sealed. For this purpose, in case of a radial screw connection at the housing of the power electronic preferably a seal is provided, in case of an axial screw connection preferably in the area of the hybrid module an appropriate seal and/or a sealing cover. Furthermore, respective seals are provided in the proximity of the power electronics housing and around the contact site.

LIST OF REFERENCE CHARACTERS 10 hybrid module
12 part
12.1 hybrid module housing
12.2 assembly opening
12.3 bore
16 recess
17 E-motor
17.1 rotor
17.2 stator
18 cooling channel
20 power electronics module
21 power electronic
22 power electronics housing
22.1 assembly opening
26 circuit board
27 cooling device
28 control and/or measuring electronic
30 sealing element
30.1 sealing sheath
31 fastening means
32 sealing cover
33.1 bore
33.2 snap fit
33.3 securing means
110 E-motor power connection at the hybrid module side
111 contact device at the hybrid module side
112 power conducting element at the hybrid module side
112.1 opening
112.2 blind hole
112.3 nut
120 electric signal and/or clutch actuator connection at the hybrid module side 130 coolant connection at the hybrid module side
210 E-motor power connection at the power electronics module side
211 contact device at the power electronics module side
212 power conducting element at the power electronics module side
212.1 opening
230 coolant connection at the power electronics module side

The invention claimed is:

1. A power electronics module for operating a hybrid module for a hybrid drive unit, the hybrid module including an E-motor, by which a drive torque of the hybrid drive unit is generated, and a stator having a circular outer housing and a flange extending radially outwardly from the circular outer housing,
the power electronics module comprising:
an E-motor power connection at a side thereof, which comprises a first contact device at the side of the power electronics module, connected to the power electronics module, for a direct connection to a second contact device integrated in the flange extending radially outwardly from the circular outer housing of the stator of the hybrid module at a hybrid module side of an E-motor power connection at the hybrid module side, wherein the direct connection is cableless.

2. The power electronics module according to claim 1, wherein the first contact device is fastened to the power electronics module.

3. The power electronics module according to claim 1, wherein the power electronics module is arranged at a part of the hybrid module and by an arrangement of the power electronics module at the part, the first contact device contacts the second contact device.

4. The power electronics module according to claim 1, wherein the first contact device comprises at least one power conducting element located at the side of the power electronics module, which is fastened directly to the power electronics module, galvanically coupled to a power electronic element of the power electronics module and capable to directly contact a power conductive element at the hybrid module side.

5. The power electronics module according to claim 4, wherein the power conducting element at the side of the power electronics module and the power conductive element at the hybrid module side are compressed to each other via a fastening element.

6. The power electronics module according to claim 5, wherein the power electronics module comprises a power electronic housing with an assembly opening that is sealable via a sealing cover by which the fastening element is accessible with a tool for applying the fastening element.

7. The power electronics module according to claim 6, wherein at least one of the power conducting element at the side of the power electronics module or the power conductive element at the hybrid module side extends through an opening formed by a sealing contact, with the sealing contact representing a cover of the power electronics module from at least one of an outer chamber surrounding the hybrid module or from an inner chamber of the hybrid module.

8. The power electronics module according to claim 1, wherein the power electronics module is arranged on a part of the hybrid module.

9. A hybrid module for a hybrid drive unit, the hybrid module comprising:
an E-motor by which a drive torque of the hybrid drive unit is generated, the E-motor including a stator having a circular outer housing and a flange extending radially outwardly from the circular outer housing, and
the hybrid module has an E-motor power connection at a hybrid module side, which has a first contact device connected to the hybrid module at the hybrid module side for a direct connection to a second contact device present at a power electronics module at a power electronics module side of the E-motor power connection at the power electronics module side, the first contact device being directly integrated on a terminal end face of the flange extending radially outwardly from the circular outer housing of the stator.

10. The hybrid module of claim 9, wherein the direct connection is cableless.

11. The hybrid module of claim 9, wherein the first contact device includes a plurality of power conducting elements that are each arranged on the radially outwardly extending flange.

12. A method for an assembly of a hybrid module for a hybrid drive unit, with the hybrid module comprising an E-motor by which a drive torque of the hybrid drive unit is generated, the E-motor including a stator having a circular outer housing and a flange extending radially outwardly from the circular outer housing,
the method comprising:
connecting a first contact device at a side of a power electronics module connected to a power electronics module of an E-motor power connection at the power electronics module side for a direct connection with a second contact device of the E-motor power connection at a hybrid module side, the second contact device being integrated on the flange extending radially outwardly from the circular outer housing of the stator, the second contact device including at least one power conducting element defining an axial end face of the stator and extending axially into the stator.

13. The method of claim 12, wherein the direct connection is cableless.

14. The method of claim 12, wherein the at least one power conducting element includes a plurality of power conducting elements that are each arranged on the radially outwardly extending flange.

* * * * *